United States Patent
Kim et al.

(10) Patent No.: US 10,824,224 B2
(45) Date of Patent: Nov. 3, 2020

(54) VERTICAL MOTION SIMULATOR AND METHOD OF IMPLEMENTING VIRTUAL REALITY OF VERTICAL MOTION USING THE SAME

(71) Applicant: ELECTRONICS AND TELECOMMUNICATIONS RESEARCH INSTITUTE, Daejeon (KR)

(72) Inventors: Dae Hwan Kim, Sejong-si (KR); Su Ran Park, Daejeon (KR); Ki Hong Kim, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/432,034

(22) Filed: Jun. 5, 2019

(65) Prior Publication Data

US 2019/0377407 A1  Dec. 12, 2019

(30) Foreign Application Priority Data

Jun. 7, 2018 (KR) .................. 10-2018-0065617

(51) Int. Cl.
*G09G 5/00* (2006.01)
*G06F 3/01* (2006.01)
(Continued)

(52) U.S. Cl.
CPC .............. *G06F 3/011* (2013.01); *G06F 3/016* (2013.01); *G06N 20/00* (2019.01); *G06T 13/40* (2013.01); *G06T 19/003* (2013.01)

(58) Field of Classification Search
CPC .................................................. G06T 19/003
See application file for complete search history.

(56) References Cited

U.S. PATENT DOCUMENTS

2006/0211495 A1* 9/2006 Lin .................. A63F 13/214
                                                        463/36
2006/0262120 A1* 11/2006 Rosenberg .............. G06F 3/011
                                                        345/473
(Continued)

FOREIGN PATENT DOCUMENTS

KR    10-2009-0002259 A    1/2009
KR    10-2017-0049135 A    5/2017

OTHER PUBLICATIONS

Myounggon Kim et al., "Scaled Jump in Gravity-reduced Virtual Environments", IEEE Transactions on Visualization and Computer Graphics, vol. 23, No. 4, Apr. 2017.

*Primary Examiner* — Charles Tseng
(74) *Attorney, Agent, or Firm* — LRK Patent Law Firm

(57) ABSTRACT

A VR motion simulator allowing a user to experience a vertical motion in VR environment by analyzing a pressure distribution of a sole of the user and estimating a posture of the user, and a method of implementing a vertical motion action of a user in VR. The simulator includes a pressure distribution image generating module generating a pressure distribution image of a sole of a user at a time of a vertical motion of the user; a sole position tracking module analyzing the pressure distribution image to detect the sole of the user, and track a position of the sole on the basis of movement of the detected sole to output sole position tracking information; and a posture estimating module estimating a posture of the user on the basis of the sole position tracking information to output posture estimation information.

11 Claims, 7 Drawing Sheets

(51) Int. Cl.
*G06T 19/00* (2011.01)
*G06N 20/00* (2019.01)
*G06T 13/40* (2011.01)

(56) References Cited

U.S. PATENT DOCUMENTS

| | | | |
|---|---|---|---|
| 2011/0009241 A1* | 1/2011 | Lane | A63B 24/0087 |
| | | | 482/8 |
| 2011/0054358 A1 | 3/2011 | Kim et al. | |
| 2011/0077904 A1 | 3/2011 | Jung et al. | |
| 2013/0132910 A1* | 5/2013 | Belmon | A63B 24/0062 |
| | | | 715/850 |
| 2017/0050096 A1* | 2/2017 | Bentley | A63B 71/0622 |
| 2017/0160793 A1* | 6/2017 | Perlin | G06F 3/011 |
| 2019/0204909 A1* | 7/2019 | Xiao | A63F 13/212 |

\* cited by examiner

VERTICAL MOTION SIMULATOR AND METHOD OF IMPLEMENTING VIRTUAL REALITY OF VERTICAL MOTION USING THE SAME

CROSS-REFERENCE TO RELATED APPLICATION

This application claims priority to and the benefit of Korean Patent Application No. 10-2018-0065617, filed Jun. 7, 2018, the disclosure of which is incorporated herein by reference in its entirety.

BACKGROUND

1. Field of the Invention

The present invention relates to a vertical motion simulator capable of estimating posture from a vertical motion of a user and a method of implementing a vertical motion of a user in a virtual reality using the vertical motion simulator.

2. Description of Related Art

Recently, in order to increase the degree of immersion and experience of a head mount display device for virtual reality, various types of physical simulation devices have been developed and put on the market.

The simulation devices may be divided into a forward walking simulator, a 3-axis/6-axis vertical motion simulator, and a 360-degree spherical rotation simulator.

The conventional simulation devices express a motion of a vehicle or an airplane, represent a 360-degree rotational motion, and enable a user to experience walking or jumping in place.

However, there is still a lack of devices for simulating a vertical motion of a human (e.g., a jump motion) in a virtual reality environment. When the ultimate goal of virtual reality is to provide an alternative experience, simulating any type of vertical motion performable by a human may allow the virtual reality to have wide applications so that a true virtual reality is implemented.

SUMMARY OF THE INVENTION

The present invention is directed to providing a vertical motion simulator allowing a user to experience a vertical motion action in a virtual reality environment by analyzing a pressure distribution of a sole of the user to estimate a posture of the user.

The present invention is directed to providing a method of implementing a vertical motion action of a user as a virtual reality by analyzing a pressure distribution of a sole of the user to estimate a posture of the user.

The technical objectives of the present invention are not limited to the above objective, and other objectives may become apparent to those of ordinary skill in the art based on the following descriptions.

According to an aspect of the present invention, there is provided a vertical motion simulator including: a pressure distribution image generating module configured to generate a pressure distribution image of a sole of a user using an electrical signal corresponding to a pressure of the sole detected at a time of a vertical motion of the user; a sole position tracking module configured to analyze the pressure distribution image to detect the sole of the user and track a position of the sole on the basis of movement of the detected sole to output sole position tracking information; and a posture estimating module configured to estimate a posture of the user on the basis of the sole position tracking information to output posture estimation information.

The vertical motion simulator may further include a virtual reality linking module configured to implement a vertical motion action of the user in a virtual reality on the basis of the posture estimation information output from the posture estimating module.

The vertical motion simulator may further include a vertical motion height calculating module configured to calculate a vertical motion height of the user on the basis of the posture estimation information output from the posture estimating module and vertical motion sensing information resulting from sensing the vertical motion of the user to output vertical motion height information. In this case, the vertical motion simulator may further include a virtual reality linking module configured to implement a vertical motion action of the user in a virtual reality on the basis of the posture estimation information output from the posture estimating module and the vertical motion height information output from the vertical motion height calculating module.

According to another aspect of the present invention, there is provided a method of implementing a virtual reality of a vertical motion, the method including: generating a pressure distribution image of a sole of a user using an electrical signal corresponding to a pressure of the sole detected at a time of a vertical motion of the user; analyzing the pressure distribution image to detect the sole of the user and tracking a position of the sole on the basis of movement of the detected sole to output sole position tracking information; estimating a posture of the user on the basis of the sole position tracking information to output posture estimation information; and implementing a vertical motion action of the user in a virtual reality on the basis of the posture estimation information.

The method may be modified to include: generating a pressure distribution image of a sole of a user using an electrical signal corresponding to a pressure of the sole detected at a time of a vertical motion of the user; analyzing the pressure distribution image to detect the sole of the user and tracking a position of the sole on the basis of movement of the detected sole to output sole position tracking information; estimating a posture of the user on the basis of the sole position tracking information to output posture estimation information; calculating a vertical motion height of the user on the basis of the posture estimation information and sensing information resulting from sensing the vertical motion of the user to output vertical motion height information; and implementing a vertical motion action of the user in a virtual reality on the basis of the posture estimation information and the vertical motion height information.

DETAILED DESCRIPTION OF EXEMPLARY EMBODIMENTS

Figure 1:
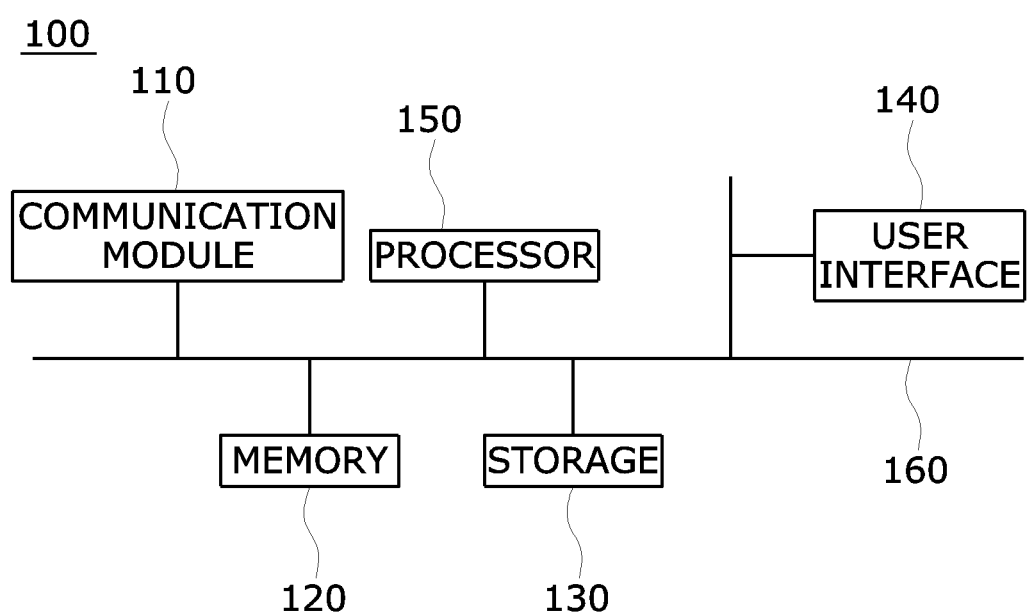
FIG. 1 is a diagram illustrating a configuration of a vertical motion simulator according to an exemplary embodiment of the present invention.

Example embodiments of the present invention are disclosed herein. However, specific structural and functional details disclosed herein are merely representative for purposes of describing the example embodiments of the present invention, and the example embodiments of the present invention may be embodied in many alternate forms and are not to be construed as limited to the example embodiments of the present invention set forth herein.

Accordingly, while the invention is susceptible to various modifications and alternative forms, specific embodiments thereof are shown by way of example in the drawings and will herein be described in detail. However, it should be understood that there is no intent to limit the invention to the particular forms disclosed, rather the invention is to cover all modifications, equivalents, and alternatives falling within the spirit and scope of the invention.

It should be understood that, although the terms first, second, etc. may be used herein to describe various elements, these elements are not limited by these terms. These terms are only used to distinguish one element from another. For example, without departing from the scope of the present invention, a first element could be termed a second element, and, similarly, a second element could be termed a first element.

It should be understood that when an element is referred to as being "connected" or "coupled" to another element, the element can be directly connected or coupled to another element or intervening elements may be present. Conversely, when an element is referred to as being "directly connected" or "directly coupled" to another element, there are no intervening elements present. Other words used to describe a relationship between elements should be interpreted in a like fashion (i.e., "between" versus "directly between," "adjacent" versus "directly adjacent," etc.).

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

It should also be noted that in some alternative implementations, functions/actions noted in blocks may occur out of the order noted in flowcharts. For example, two blocks shown in succession may in fact be executed substantially concurrently or the blocks may sometimes be executed in a reverse order depending upon the functionality/actions involved.

Hereinafter, embodiments of a vertical motion simulator performing posture estimation proposed according to the present invention will be described in detail with reference to the accompanying drawings. The vertical motion simulator according to the embodiment is implemented to estimate a vertical motion posture of a user using the vertical motion simulator.

FIG. 1 is a diagram illustrating a configuration of a vertical motion simulator 100 according to an exemplary embodiment of the present invention.

Referring to FIG. 1, the vertical motion simulator 100 according to the exemplary embodiment of the present invention is implemented to estimate a posture of a user using position tracking information of a sole obtained on the basis of a pressure distribution image generated according to an electrical signal from a pressure sensor and implement a vertical motion action of the user in a virtual reality (linking with a virtual reality character) on the basis of the estimated posture and a vertical motion height measurement value.

To this end, the vertical motion simulator 100 includes at least one communication module 110 for communication with an external device, at least one memory 120 and at least one storage 130 for storing an algorithm (or a program) required for performing functions, a result of operation execution, and the like, a user interface 140 for interfacing with a user, and at least one processor 150 for performing the functions.

The above-described components 110 to 150 are implemented to transmit and receive data using a communication bus 160 in the vertical motion simulator 100.

The communication module 110 is configured to communicate with an external device and may be implemented to communicate therewith using various communication methods according to the design of the vertical motion simulator 100.

For example, the communication module 110 may use various wireless communication methods, such as near field communication (NFC), ZigBee, WiFi, Bluetooth, Beacon, radio frequency identification (RFID), and the like.

The memory 120 and the storage 130 are configured to store an algorithm (or a program) required for performing functions of the processor 150 and to store results of operations performed by the processor 15.

The memory 120 and the storage 130 may include various forms of volatile or non-volatile storage media.

The memory 120 may include a read only memory (ROM) and a random access memory (RAM), and the storage 130 may include a NAND flash memory, such as a compact flash (CF) card, a secure digital (SD) card, a memory stick, a solid-state drive (SSD) and a micro SD card, a magnetic computer storage device, such as a hard disk drive (HDD), and an optical disc drive, such as a compact disc read only memory (CD-ROM) and a digital versatile disc (DVD)-ROM.

The user interface 140 is a component for interfacing with a user and may include an input device and an output device.

The processor 150 is implemented to estimate a posture from an image obtained from a pressure sensor and link the posture of the user with a virtual reality character on the basis of the estimated posture and a vertical motion height measurement value.

The processor 150 may perform functions by loading an algorithm (or a program) required for performing the functions from the memory 120 provided outside the processor 150 and may include at least one engine for performing the functions.

Alternatively, the processor 150 may include a memory storing an algorithm (or a program) required for performing functions and may perform functions by loading an algorithm (or a program) stored in the memory inside the processor 150.

Figure 2:
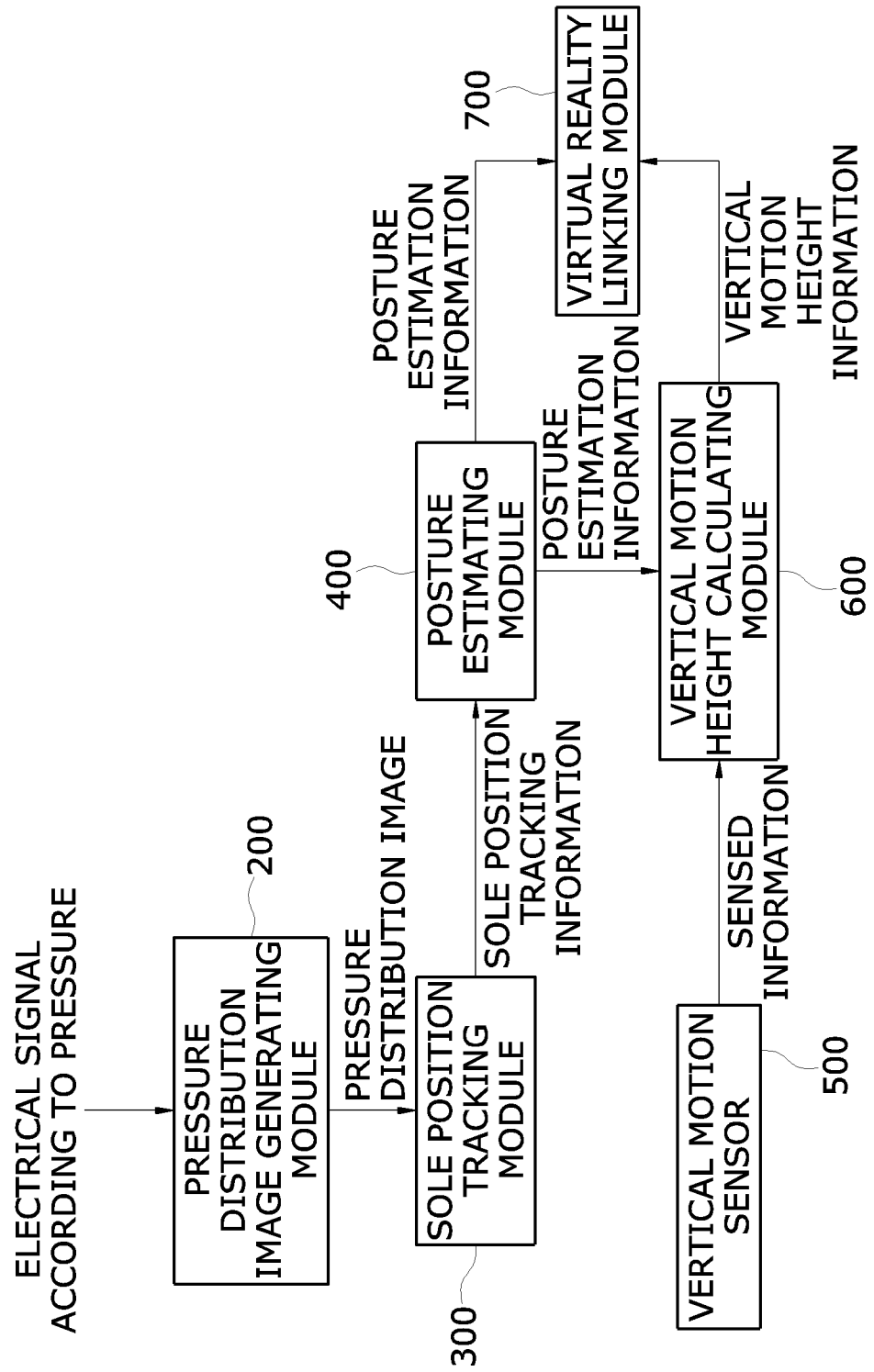
FIG. 2 is a block diagram illustrating a processor of a vertical motion simulator.

FIG. 2 is a block diagram illustrating the processor 150 of the vertical motion simulator 100 according to the exemplary embodiment of the present invention.

Referring to FIG. 2, the processor 150 includes a pressure distribution image generating module 200, a sole position tracking module 300, a posture estimating module 400, a vertical motion height calculating module 600, and a virtual reality linking module 700.

The pressure distribution image generating module 200, the sole position tracking module 300, the posture estimating module 400, the vertical motion height calculating module 600, and the virtual reality linking module 700 are illustrated as being implemented in a single processor but may be implemented in a plurality of processors.

The pressure distribution image generating module 200 receives an electrical signal output from a device for sensing a pressure when the user performs a vertical motion action and generates a pressure distribution image as programmed in advance.

Figure 3:
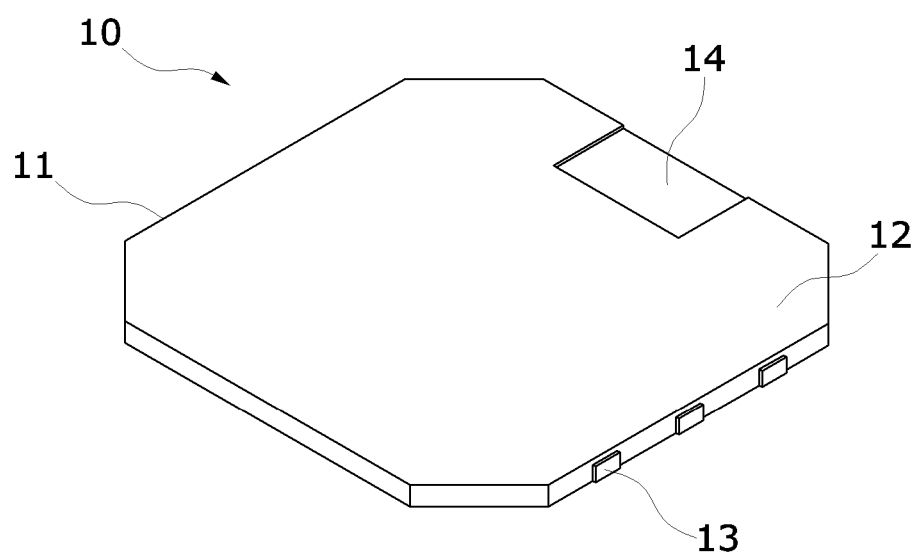
FIG. 3 is a diagram illustrating a base of a vertical motion simulator according to an exemplary embodiment of the present invention.

An example of the device for sensing the pressure when the user performs the vertical motion action is illustrated in FIG. 3. The device shown in FIG. 3 is a base 10 in the form of a support plate on which the user stands. In order to perform a vertical motion action, the user stands on the base 10 and performs a vertical motion action (e.g., a jump action). The base 10 includes a frame 11 forming the external appearance thereof and a pressure sensor module 12 disposed inside the frame 11 so as to not be damaged by an external shock. On the upper portion of the pressure sensor module 12, a mat (not shown) for compensating for an impact due to the vertical motion of the user is provided.

The pressure sensor module 12 includes a plurality of pressure sensors. A plurality of pressure sensors generate electrical signals corresponding to the pressure received from the outside. The electrical signal output from the pressure sensor module 12 is used to analyze the posture of the user in the present invention.

The base 10 includes a wheel fastening portion 13 provided at one side of the frame 11. When a wheel is fastened to the wheel fastening portion 13, the vertical motion simulator 100 may be easily moved. In addition, the base 10 includes a column connecting portion 14 provided at the other side of the frame 11. The column connecting portion 14 is connected with a column 30 which will be described below with reference to FIGS. 5 to 7.

Since the plurality of pressure sensors included in the pressure sensor module 12 output electrical signals in response to a pressure received from the outside, the pressure distribution image generating module 200 of the processor 150 may identify the positions of the pressure sensors outputting the electric signals using the electrical signals and may generate a pressure distribution image (i.e., a pressure distribution chart when the user standing on the base 10 takes a vertical motion) on the basis of the positions of the identified pressure sensors. For example, the pressure distribution image generating module 200 may generate a pressure distribution image according to a predetermined sampling period.

Since the plurality of pressure sensors included in the pressure sensor module 12 are small in size, it is desirable to use a plurality of pressure sensors in units of arrays. Thus, for example, the plurality of pressure sensors may be arranged in the form of a grid (e.g., 3×3) to obtain a single pressure distribution image. In order to generate a seamless single image using the obtained pressure distribution images, image distortion is corrected and fine differences in each pressure distribution are normalized.

In FIGS. 2 and 3, the pressure distribution image generating module 200 and the base 10 are illustrated as separate components, but it should be understood by those skilled in the art that the pressure distribution image generating module 200 itself may include a component serving as the base 10 or the pressure sensor module 12 as an integral structure.

The pressure distribution image generating module 200 outputs the generated pressure distribution image to the sole position tracking module 300.

The sole position tracking module 300 performs a time series analysis on a series of pressure distribution images received from the pressure distribution image generating module 200 to detect a sole of the user and tracks the position of the sole on the basis of change (movement) of the position of the sole as programmed in advance.

Specifically, in order to estimate the posture of a human according to the present invention, there is a need to detect a sole in one frame of a pressure distribution image and track the positions of each sole in the subsequent frames. In particular, since the position of a sole may be variously changed according to the posture taken by the user, the sole needs to be accurately tracked in the time-series images (pressure distribution images). In order to detect a sole, first, single components at a portion in which a pressure has occurred in a pressure distribution image are searched for. A pressure pattern and shape of a sole are identified from the found single components to discriminate components that are likely to form a sole. The pressure pattern and shape of the sole may be identified by learning using various pattern recognition methods. Finally, components discriminated as a sole are accurately segmented using pressure distribution value thresholding technique. Feature information (e.g., pressure distribution, shape, position, direction, and the like) is extracted from the sole segmented from each pressure distribution image as such, and the extracted feature information is analyzed to generate motion feature information (e.g., speed, acceleration, vertical motion, and the like). On the basis of the features of the sole generated as such, the position of the sole is tracked using a Kalman filter and association technique. In this way, even when the order of the left sole and the right sole is lost, the soles may be accurately tracked. Information about the tracked soles is used for the next pressure distribution image.

The sole position tracking module 300 outputs the sole position tracking information to the posture estimating module 400.

The posture estimating module 400 estimates the posture by applying the sole position tracking information from the sole position tracking module 300 to a deep learning technique as programmed in advance. For example, the posture estimating module 400 may estimate the posture using a convolutional neural network (CNN) technique.

In detail, the posture estimating module 400 serves to estimate the posture of the user using information about the detected and tracked sole pressure distribution. It is practically impossible to accurately estimate the positions of joints (head, neck, shoulder, elbow, hand, pelvis, knee, and foot) of the user's body from the pressure distribution image of both soles according to the vertical motion of the user. However, since humans have upright structures similar in shape, analogous postures may be roughly estimated. Accordingly, the posture estimating module 400 extracts features of the direction, shape, and pressure distribution of the sole and estimates the posture of the person through deep learning using the features. The posture estimating module 400 uses convolutional neural networks as an algorithm for the deep learning and employs postures suitable for vertical motion simulation according to the present invention (walking, running, leaning in different directions, stepping with one foot, jumping on one foot, jumping on two feet) as learning data. For the learning, labels corresponding to pieces of pressure data, that is, pieces of posture information, are needed, and the labels are simultaneously collected using a depth camera The posture estimating module 400 outputs the posture estimation information to the vertical motion height calculating module 600 and the virtual reality linking module 700.

The vertical motion height calculating module 600 may calculate a vertical motion height of the user on the basis of the posture estimation information from the posture estimating module 400 and sensing information of an action of the user sensed by the vertical motion sensor 500.

Figure 5:
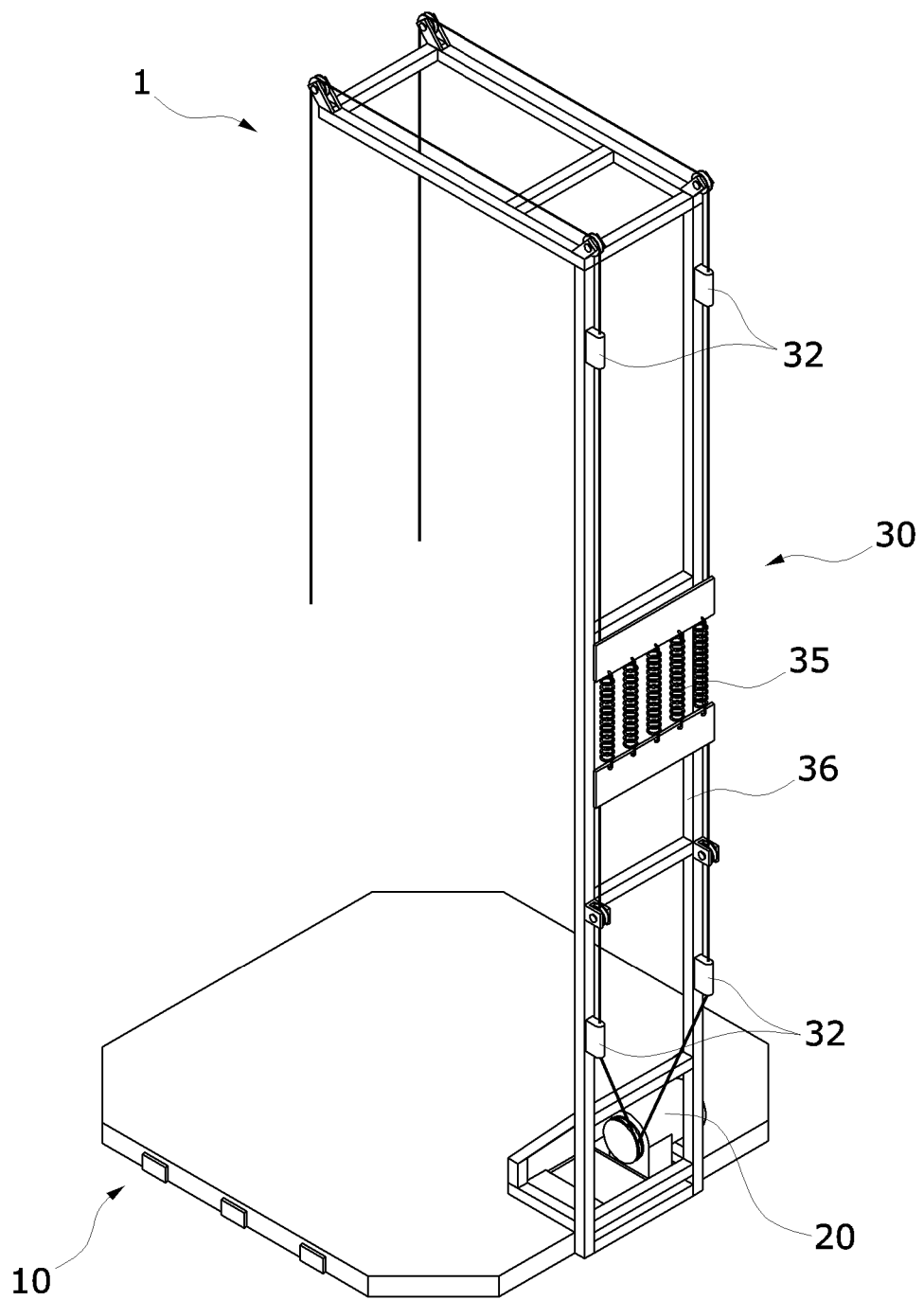
FIG. 5 is a perspective view illustrating a user vertical motion assisting mechanism applicable to a vertical motion simulator according to an exemplary embodiment of the present invention which is viewed from one direction.
Figure 6:
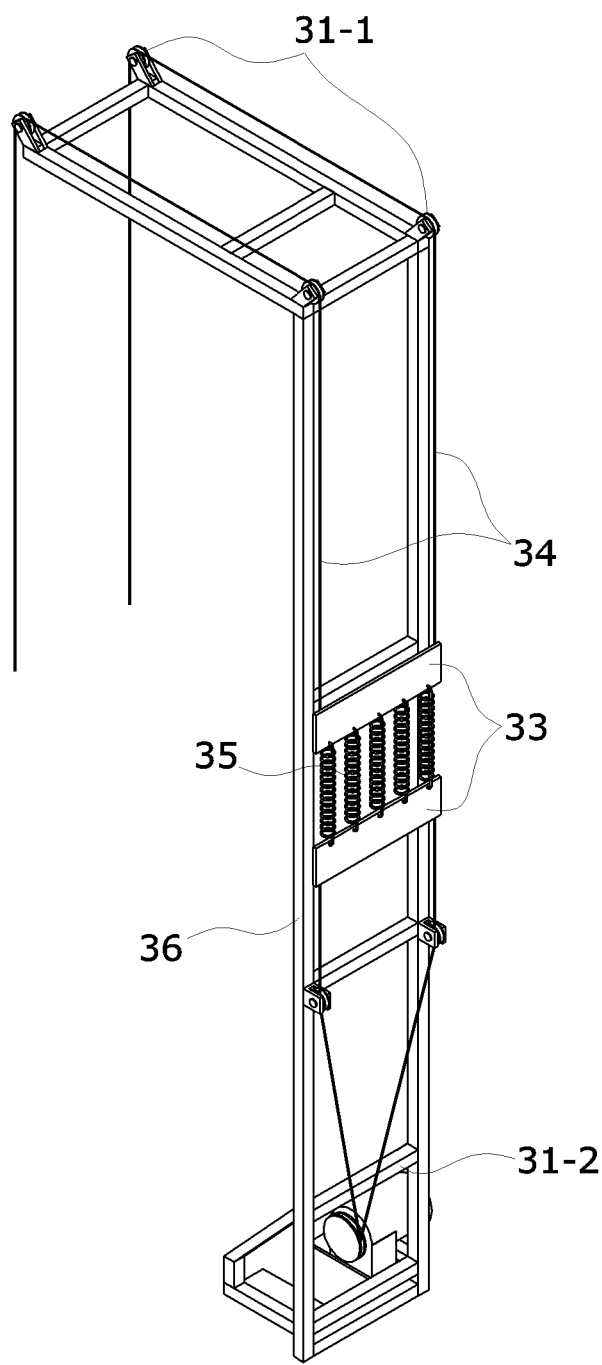
FIG. 6 is a view illustrating a column of a user vertical motion assisting mechanism which is viewed from above.
Figure 7:
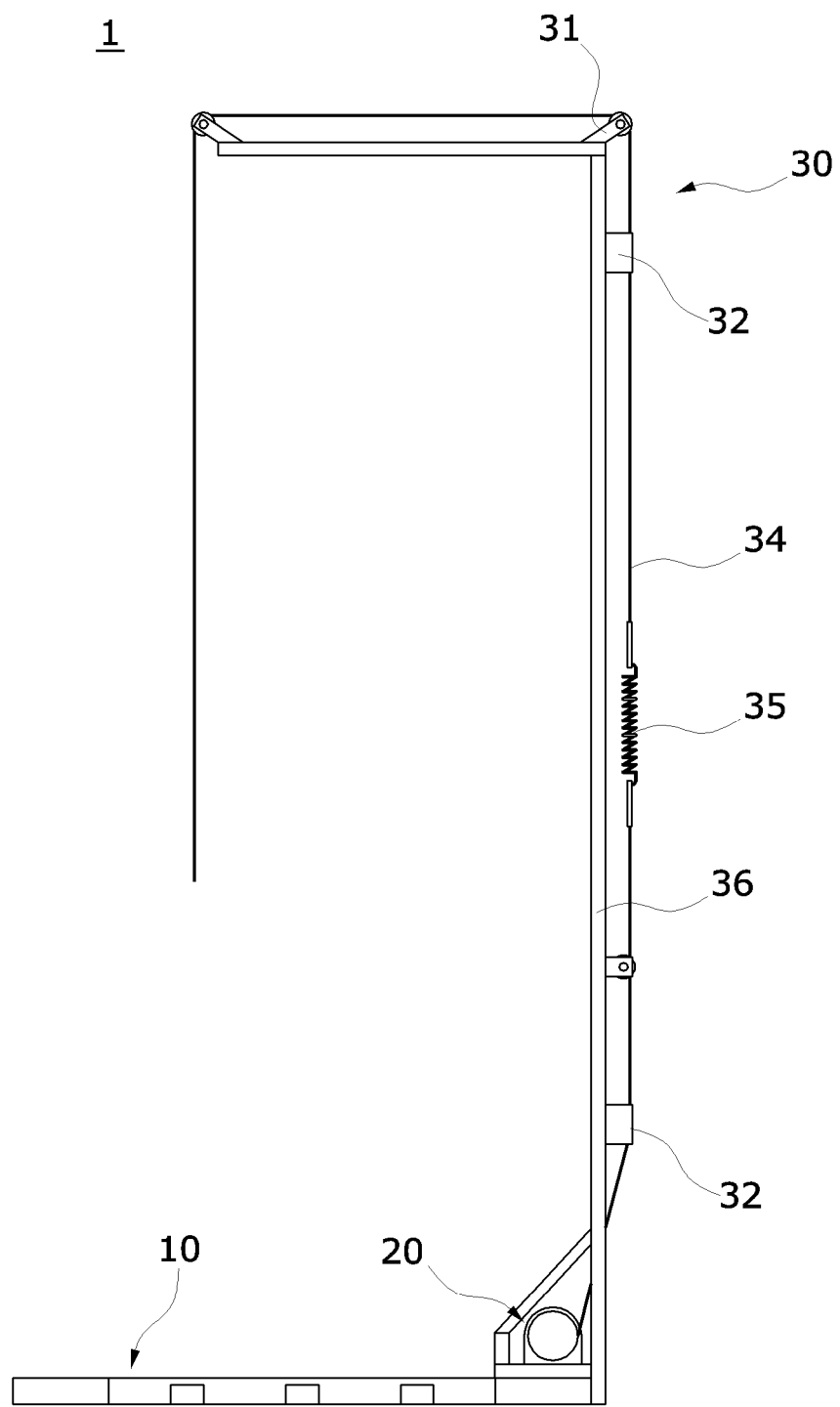
FIG. 7 is a view illustrating a user vertical motion assisting mechanism which is viewed from a lateral side.

A lidar, which is used as the vertical motion sensor 500 for sensing a vertical motion of a user, senses the degree of vertical movement of the user (sensing information) and outputs the sensing information. In addition to the lidar, the vertical motion sensor 500 may be implemented using various types of motion detection sensors (depth cameras, stereo cameras, ultrasonic sensors, walking meter sensors, and the like), which are currently usable as a vertical motion sensor. In order to remove noise of the sensing information of the lidar, pieces of time series information of the sensing data are subject to a mean filter such that the sensing information is corrected (refer to a mechanism for assisting a vertical motion of a user using the vertical motion sensor 500 as shown in FIGS. 5 to 7). The sensing information is transmitted to the vertical motion height calculating module 600.

The vertical motion height calculating module 600 temporally matches two pieces of information (i.e., posture estimation information and sensing information), which are input through different points of times and different paths, to calculate an accurate vertical motion height. That is, since each piece of information provided by the posture estimating module 400 and the vertical motion sensor 500 has a different speed, a process of synchronizing the pieces of information is required. The posture estimation information provides the exact point of time at which the vertical motion actually occurs, and the vertical motion sensing information assists in calculating the height when the user is floating in the air. As such, the two pieces of required information at different points of time are temporally matched, and a ground reaction force at the time of the vertical motion is calculated from the pressure distribution so that an accurate jump height is calculated.

The vertical motion height calculating module 600 outputs the calculated vertical motion height information to the virtual reality linking module 700.

The virtual reality linking module 700 may implement a vertical motion action in real time or with a time delay using the posture estimation information from the posture estimating module 400 and the vertical motion height information from the vertical motion height calculating module 600 as programmed in advance. For example, the virtual reality linking module 700 rigs a real time posture and motion at a time of a vertical motion of the user with a virtual character such that the virtual character performs a vertical motion action according to the vertical motion action of the user.

Figure 4:
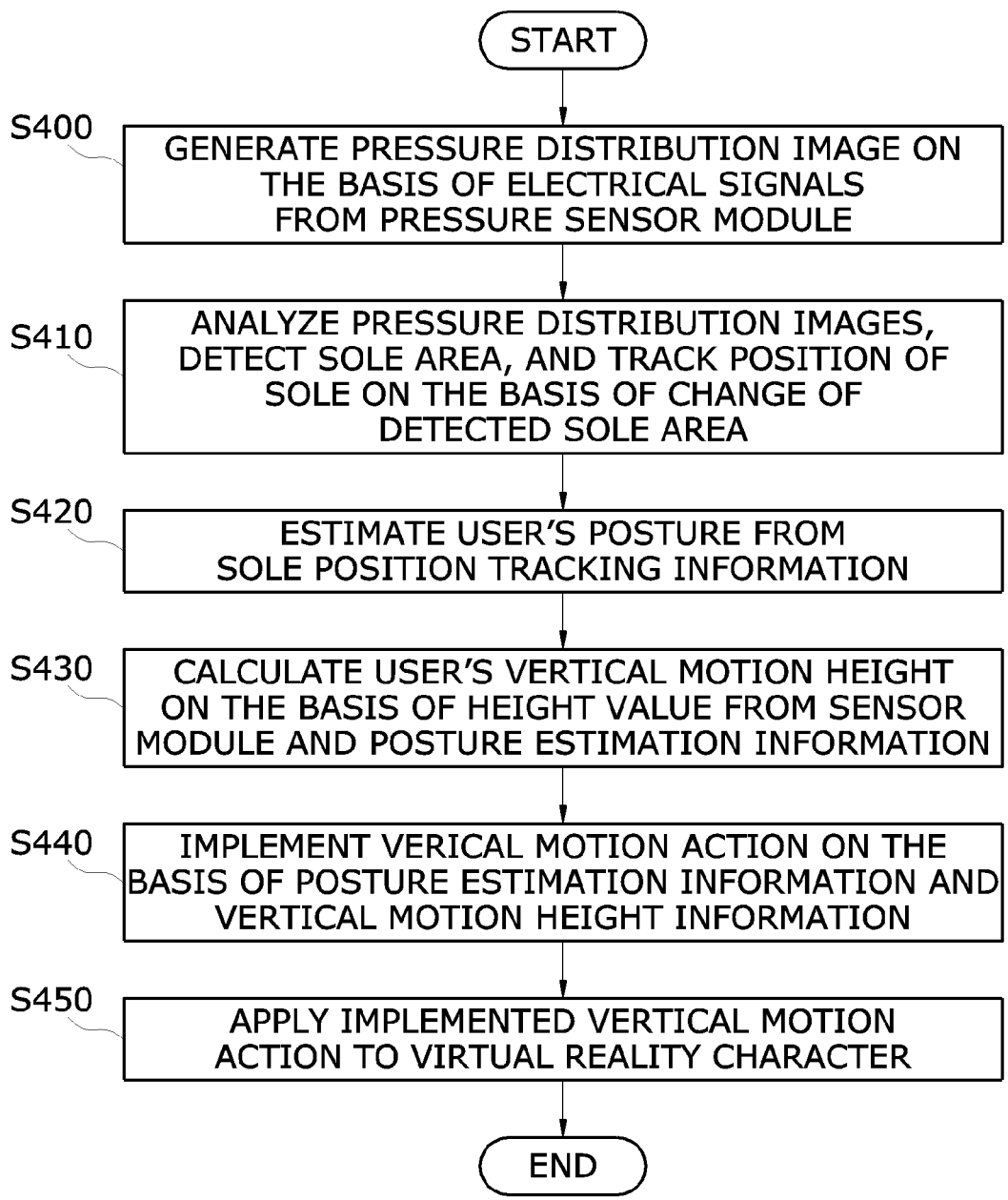
FIG. 4 is a flowchart for describing a process of estimating a vertical motion posture using a vertical motion simulator according to an exemplary embodiment of the present invention and applying the estimated vertical motion posture to a character of a virtual reality.

The configuration of the vertical motion simulator according to the exemplary embodiment of the present invention and functions thereof have been described above. The following description will be made in relation to estimation of a vertical motion posture using the vertical motion simulator and application of the vertical motion posture to a virtual reality character FIG. 4 is a flowchart for describing a process of estimating a vertical motion posture using a vertical motion simulator according to an exemplary embodiment of the present invention and applying the estimated vertical motion posture to a character of a virtual reality. The stepwise operations shown in FIG. 4 may be performed by the vertical motion simulator 100 described with reference to FIG. 2.

The processor 150 for performing the functions of the vertical motion simulator 100 shown in FIG. 2 generates a pressure distribution image on the basis of electrical signals from the pressure sensor module 12 (S400).

The processor 150 analyzes the pressure distribution images generated in operation S400 to detect a sole and tracks the position of the sole on the basis of a change of the detected sole (S410).

The processor 150 estimates a posture of the user from sole position tracking information of the position of the sole resulting from the tracking in operation S410 (S420). In this case, a machine learning technique may be used for the estimation of the user posture.

The processor 150 calculates a vertical motion height of the user on the basis of a height value from the vertical motion sensor 500 and posture estimation information resulting from the estimation in operation S420 (S430).

The processor 150 implements a vertical motion action on the basis of the posture estimation information resulting from the estimation in operation S420 and the vertical motion height information resulting from the calculation in operation S430 (S440).

The processor 150 applies the vertical motion action implemented according to operation S440 to a character of a virtual reality (S450) such that the virtual character performs a vertical motion action according to the vertical motion action of the user.

In the descriptions above, although all of the components of the embodiments of the present invention may have been described as assembled or operatively connected as a unit, the present invention is not intended to be limited to such embodiments. Rather, within the objective scope of the present invention, the respective components may be selectively combined in any number. Also, every one of the components may be implemented by itself in hardware while the respective components can be combined in part or as a whole selectively and implemented in a computer program having program modules for executing some or all functions of a combination of one or more hardware components. The computer program may be stored in computer readable media, such as a Universal Serial Bus (USB) memory, a compact disc (CD), a flash memory, etc., which is read and executed by a computer to realize the embodiments of the present invention. For a recording medium of the computer program, the candidates include magnetic recording media, optical recording media, and carrier wave media.

Hereinafter, a user vertical motion assisting mechanism applicable to the above described vertical motion simulator 100 according to the exemplary embodiment of the present invention will be described (the following description relates to a mechanism for assisting a jump action (jumping) among various vertical motions).

FIG. 5 is a perspective view illustrating a jumping assisting mechanism viewed from one direction, FIG. 6 is a perspective view illustrating a column of the jumping assisting mechanism viewed from above, and FIG. 7 is a side view of the jumping assisting mechanism.

The jumping assisting mechanism that is usable for the vertical motion simulator 100 according to the embodiment of the present invention includes mechanisms that assist a user in performing a jump action and is configured to measure a pressure according to a jumping action of the user.

Referring to FIGS. 5 to 7, the jumping assisting mechanism 1 includes a base 10 as described above with reference to FIG. 3, along with a motor 20 and a column 30.

Since the base 10 is the same as that described with reference to FIG. 3, a detailed description thereof will be omitted.

The motor 20 is installed in the base 10, for example, adjacent to a column connecting portion 14 or on the column connecting portion 14. The motor 20 is provided to adjust the jumping power according to the weight of a user. A spring assembly 33 including at least one spring 35 is installed on the column 30 to be connected to a wire 34. The wire 34 connected to the spring assembly 33 is wound on the motor 20. Adjustment of the length of the wire 34 allows the length of the spring 35 in the spring assembly 33 to be adjusted to reduce the gravity at a time of jumping such that the user may easily jump.

In order for a user to use the jumping assisting mechanism 1 to use the vertical motion simulator according to the present invention, the user needs to jump with the wire 34 connected to the user's body or connected to a separate wearable harness. In this case, since the weight is different for each person, the length of the wire 34 needs to be adjusted using the motor 20 in the early stage of jumping.

The column 30 is connected to the column connecting portion 14 of the base 10. The column 30 supports the wire 34 to assist the user in performing a stable jumping action. In addition, the column 30 is a portion to which the sensor 500 for sensing a user's vertical motion (e.g., jumping) as described above is attached.

A main element of the column 30 is a support 36. Since the support 36 is formed in an inverted L shape, the wire 34 does not need to be hung on the ceiling of a house or an experience center. Obviation of the need to hang the wire 34 on the ceiling facilitates installment and removal of the wire 34. The support 36 is provided with a plurality of rollers 31 that are disposed to allow a double wire to be rolled in a '⊏' shape (a quadrangle with one side open). That is, referring to FIG. 6, when five rollers 31 are disposed on the support 36, four rollers 31-1 are disposed on a flat upper surface of the support 36, and one roller 31-2 is disposed on the spring assembly 33. In addition, a plurality of wire separation preventing clips 32 for preventing the double wire 34 from being separated from the support 36 are disposed on the support 36.

As is apparent from the above, the vertical motion simulator provided by the present invention allows a vertical motion action of a user to be linked with a virtual reality (e.g., a VR character), so that the vertical motion action of the user is applied to the virtual reality, thus enabling the user to experience the vertical motion action in the virtual reality. In addition, the vertical motion simulator provided by the present invention estimates not only a vertical motion action but also a posture in the vertical motion action so that more accurate vertical motion and various actions can be recognized.

The vertical motion simulator according to the present invention acquires various types of information used not only as base information for virtual reality, but also as base information for augmented reality, body pose estimation, gesture recognition, human-robot interface (HRI), human-computer interface (HCI), and artificial intelligence.

Although the vertical motion simulator capable of estimating a posture according to the present invention and the method of implementing a vertical motion action of a virtual character using the same have been described with reference to the embodiments, those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. The scope of the invention is set forth in the following claims rather than the embodiments and accompanying drawing, and it is intended that the present invention covers all modifications provided they come within the scope of the appended claims and their equivalents.

What is claimed is:

1. A vertical motion simulator comprising:
   a processor;
   one or more computer-executable modules being configured and executed by the processor using algorithms associated with at least one non-transitory storage device, the algorithms, when executed, causing the processor to execute the one or more computer-executable modules, the one or more computer-executable modules comprising:
   a pressure distribution image generating module configured to generate a pressure distribution image of a sole of a user using an electrical signal corresponding to a pressure of the sole detected at a time of a vertical motion of the user;
   a sole position tracking module configured to analyze the pressure distribution image to detect the sole of the user and track a position of the sole on a basis of movement of the sole to output sole position tracking information; and
   a posture estimating module configured to estimate a posture of the user on a basis of the sole position tracking information to output posture estimation information;
   a vertical motion height calculating module configured to calculate a vertical motion height of the user on a basis of the posture estimation information output from the posture estimating module and vertical motion sensing information resulting from sensing the vertical motion of the user to output vertical motion height information,
   wherein in order to calculate the vertical motion height, the vertical motion height calculating module temporally matches the posture estimation information and the vertical motion sensing information and a ground reaction force at the time of the vertical motion is calculated using pressure distribution information so that an accurate jump height is calculated.

2. The vertical motion simulator of claim 1, wherein the electrical signal used to generate the pressure distribution image of the sole by the pressure distribution image generating module is generated by a pressure sensor for detecting the pressure of the sole of the user at the time of the vertical motion of the user.

3. The vertical motion simulator of claim 1, wherein the pressure distribution image generated by the pressure distribution image generating module includes a plurality of pressure distribution images each generated at a predetermined sampling period.

4. The vertical motion simulator of claim 1, wherein, n order to track the position of the sole, the sole position tracking module uses sole feature information extracted from the sole detected from the pressure distribution image and analyzes the sole feature information to generate sole movement feature information.

5. The vertical motion simulator of claim 1, wherein, in order to estimate the posture of the user, the posture estimating module uses machine learning on the sole position tracking information obtained from the sole position tracking module.

6. The vertical motion simulator of claim 1, wherein a sensor for sensing the vertical motion of the user includes a lidar for sensing a position at which the user floats in air during the vertical motion.

7. The vertical motion simulator of claim 1, further comprising a virtual reality linking module configured to implement a vertical motion action of the user in a virtual reality on the basis of the posture estimation information output from the posture estimating module.

8. The vertical motion simulator of claim 7, wherein the virtual reality linking module is implemented to apply the vertical motion action of the user to a virtual reality character such that the virtual reality character performs the vertical motion action of the user.

9. The vertical motion simulator of claim 1, further comprising a virtual reality linking module configured to implement a vertical motion action of the user in a virtual reality on the basis of the posture estimation information output from the posture estimating module and the vertical motion height information output from the vertical motion height calculating module.

10. The vertical motion simulator of claim 9, wherein the virtual reality linking module is implemented to apply the vertical motion action of the user to a virtual reality character such that the virtual reality character performs the vertical motion action of the user.

11. A method of implementing a virtual reality of a vertical motion, the method comprising:
  generating a pressure distribution image of a sole of a user using an electrical signal corresponding to a pressure of the sole detected at a time of the vertical motion of the user;
  analyzing the pressure distribution image to detect the sole of the user and tracking a position of the sole on a basis of movement of the sole to output sole position tracking information;
  estimating a posture of the user on a basis of the sole position tracking information to output posture estimation information; and
  implementing a vertical motion action of the user in the virtual reality on a basis of the posture estimation information,
  calculating a vertical motion height of the user on the basis of the posture estimation information and vertical motion sensing information resulting from sensing the vertical motion of the user to output vertical motion height information,
  wherein in order to calculate the vertical motion height, the posture estimation information and the vertical motion sensing information is temporally matched and a ground reaction force at the time of the vertical motion is calculated using pressure distribution information so that an accurate jump height is calculated.

* * * * *